(12) United States Patent
Wang

(10) Patent No.: US 6,326,536 B1
(45) Date of Patent: Dec. 4, 2001

(54) SCORING DEVICE AND METHOD FOR A KARAOKE SYSTEM

(75) Inventor: Hung-Min Wang, Hsinchu (TW)

(73) Assignee: Winbond Electroncis Corp., Hsinchu (TW)

( * ) Notice: Subject to any disclaimer, the term of this patent is extended or adjusted under 35 U.S.C. 154(b) by 0 days.

(21) Appl. No.: 09/566,598

(22) Filed: May 8, 2000

(30) Foreign Application Priority Data

Aug. 30, 1999 (TW) .............................................. 088114822

(51) Int. Cl.⁷ .............................. G09B 5/00; G09B 15/02
(52) U.S. Cl. ...................................... 84/477 R; 434/307 A
(58) Field of Search ...................... 84/609–614, 633–638, 84/477 R, 478; 434/307 A

(56) References Cited

U.S. PATENT DOCUMENTS 5,804,752 * 9/1998 Sone et al. ..................... 84/477 R X
5,906,494 * 5/1999 Ogawa et al. ................... 434/307 A

* cited by examiner

Primary Examiner—Stanley J. Witkowski
(74) Attorney, Agent, or Firm—Ladas & Parry

(57) ABSTRACT

A scoring device for an karaoke system is provided. The scoring device includes a first detector for the original singer, a second detector for the karaoke singer, and a processor. The first detector is provided to detect the volume of the original singer's singing voice. The second detector is provided to detect the volume of the karaoke singer's singing voice. The processor is provided to compare the volumes of the original singer's singing voice and the karaoke singer's singing voice, and provides a score for the karaoke singer's singing voice based on the compared results.

25 Claims, 4 Drawing Sheets

SCORING DEVICE AND METHOD FOR A KARAOKE SYSTEM

BACKGROUND OF THE INVENTION

1. Field of the Invention

The present invention relates to a scoring device and method for a karaoke system, and in particular, to a low-cost and simply structured scoring device and method for a karaoke system, which can impartially score a karaoke singer's singing voice.

2. Description of the Related Art

In a singing competition, participants are usually ranked by professional graders. However, the training of professional graders are time-consuming, and preferences of different graders can be controversial; therefore, an computer provided with a scoring device is sometimes used to replace the professional graders. The scoring device is used to detect voice-related parameters of an input singing voice, perform complicated arithmetic operations on these parameters to analyze tone, tempo and timbre of the input singing voice, and impartially provide a score based on the analyzed results.

Nowadays, the scoring device is often structured with a built-in DSP chip to perform the corresponding arithmetic operations. However, the DSP chip is expensive and uneconomical for home-used karaoke systems, so a lower-cost and simpler structured scoring device which can still score a karaoke singer's singing voice is desirable.

SUMMARY OF THE INVENTION

Accordingly, the present invention has provided a scoring device for a karaoke system. The scoring device includes a first detector for the original singer, a second detector for the karaoke singer, and a processor. The first detector is provided to detect the volume of the original singer's singing voice. The second detector is provided to detect the volume of the karaoke singer's singing voice. The processor is provided to compare the volumes of the original singer's singing voice and the karaoke singer's singing voice, and provide a score for the karaoke singer's singing voice based on the compared results.

In the scoring device of the present invention, the first and second detector can each include a low-pass filter and a level detector. The low-pass filter is provided to screen out high-frequency noise of the original singer's singing voice and the karaoke singer's singing voice, respectively. The level detector is provided to compare the volumes of the filtered singing voice with a predetermined value to generate a first digital pulse sequence and a second digital pulse sequence, respectively.

Further, the scoring device of the present invention can further include a channel selector which is provided to select input channel from the L/R channels of the karaoke system through which the original singer's singing voice is input. Moreover, the scoring device of the present invention can further includes a microphone through which the karaoke singer's singing voice is inputted. Moreover, the scoring device of the present invention can further include rectifiers for rectifying the first digital pulse sequence and the second digital pulse sequence. Moreover, the scoring device of the present invention can further include a display for showing the score and corresponding comments.

Further, in the scoring device of the present invention, the processor can include a sampling means, a comparing means and an arithmetic means. The sampling means is provided to sample the volumes of the original singer's singing voice and the karaoke singer's singing voice. The comparing means is provided to compare the sampled volumes of the original singer's singing voice and the karaoke singer's singing voice. The arithmetic means is provided to calculate a score for the karaoke singer's singing voice based on the similarity between the sampled volumes of the original singer's singing voice and the karaoke singer's singing voice.

In addition, the present invention also provides a scoring method for a karaoke system. First, the volume of an original singer's singing voice and the volume of a karaoke singer's singing voice are detected. Then, the volumes of the original singer's singing voice and the karaoke singer's singing voice are compared, and a score and corresponding comments for the karaoke singer's singing voice is provided based on the compared result and output through a display panel.

In this scoring method, the original singer's singing voice and the karaoke singer's singing voice are filtered to screen out high-frequency noise before the volume is detected.

Further, the comparing step can include the following steps. First, sample the volumes of the original singer's singing voice and the karaoke singer's singing voice. Then, compare the sampled volumes of the original singer's singing voice and the karaoke singer's singing voice, and calculate the similarity between the sampled volumes of the original singer's singing voice and the karaoke singer's singing voice based on the accumulated similarity.

BRIEF DESCRIPTION OF THE DRAWINGS

The present invention will be described in detail with reference to the illustrated embodiments and the accompanying drawings, in which.

DETAILED DESCRIPTION OF THE INVENTION

Figure 1:
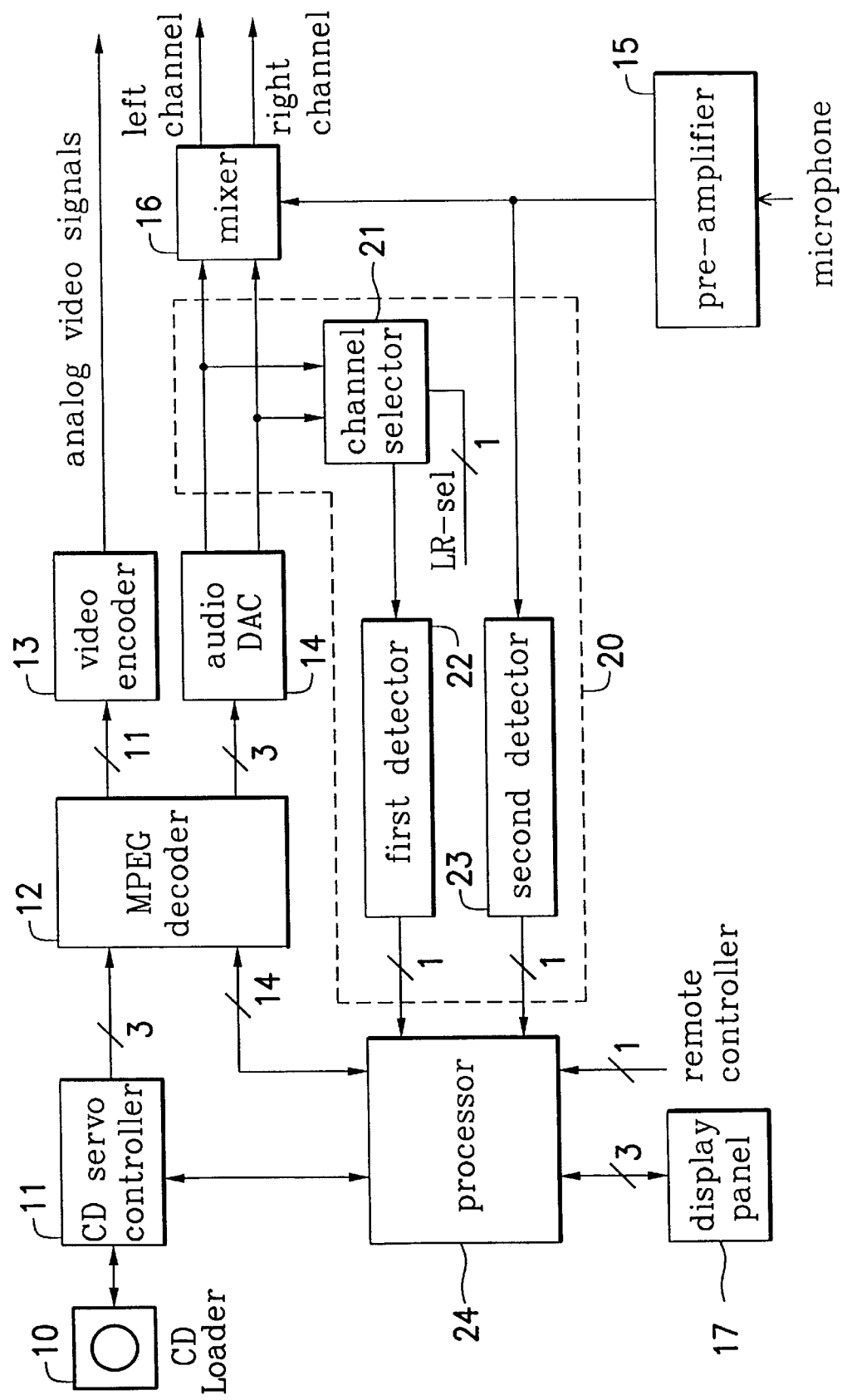
FIG. 1 is a block diagram showing a scoring device for a karaoke system according to the present invention.

FIG. 1 is a block diagram showing a scoring device for a karaoke system according to the present invention.

As shown in FIG. 1, the karaoke system includes a CD loader 10, a CD servo controller 11, an MPEG decoder 12, a video encoder 13, an audio DAC (digital-to-analog converter) 14, a pre-amplifier 15, a mixer 16, a display panel 17, and a processor 24.

The CD loader 10 is provided to support a to-be-played VCD title. The CD servo controller 11 is provided to read VCD bitstream data from the VCD title supported on the CD loader 10. The MPEG decoder 12 is provided to receive the VCD bitstream data from the CD servo controller 11, and decode the VCD bitstream data into digital video and audio signals. The video encoder 13 is provided to encode the digital video signals from the MPEG decoder 12 into analog video signals, and output the analog video signals through a TV screen (not shown). The audio DAC 14 is provided to convert the digital audio signals from the MPEG decoder 12 into analog audio signals (that is, the original singer's singing voice), and output the analog audio signals through L/R channels of the karaoke system. The pre-amplifier 15 is provided to amplify input audio signals (that is, the karaoke singer's singing voice). The input audio signal is usually obtained from a microphone (not shown). The mixer 16 is provided to mix the analog audio signals (the original singer's singing voice) from the audio DAC 14 and the input audio signals (the karaoke singer's singing voice), and output them through L/R channels respectively. The L/R channels are usually connected to external speakers or audio entries of a TV. The processor 24 is provided to initialize the MPEG decoder 12, control the CD servo controller 11 to read the VCD bitstream data, perform specific operations based on input instructions, and output corresponding information based on the input instructions or the performed operations. The display panel 17 is connected to the processor 24 and provided to display the corresponding information.

The scoring device 20 of the present invention is installed between the processor 24 and the L/R channels of the audio DAC 14, and includes a channel selector 21, a first detector 22 for the original singer, and a second detector 23 for the karaoke singer.

The channel selector 21 is connected between the L/R channels of the audio DAC 14 and the first detector 22 for the original singer, and provided to select an input channel for the original singer's singing voice from the L/R channels of the audio DAC 14. Based on VCD specification, the original singer's singing voice is inputted through the left channel. However, it is also possible for some VCD title vendors to input the original singer's singing voice through the opposite channel (the right channel). Consequently, the channel selector 21 introduced in the present invention can freely select the left channel or the right channel to input the original singer's singing voice. In this embodiment, the channel selector 21 is structured with a multiplexor. The multiplexor is controlled by a control signal LR-SEL of the processor 24, which is indicative of the input channel of the original singer's singing voice.

Figure 2:
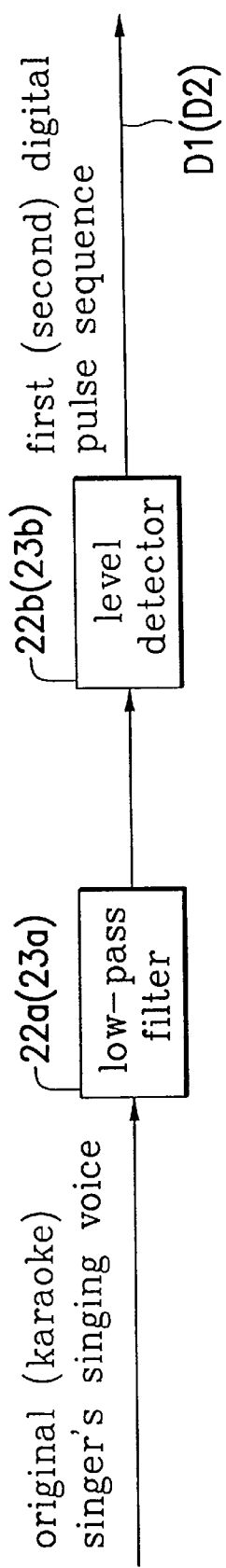
FIG. 2 is a block diagram showing a first detector and a second detector in the scoring device of FIG. 1.

The first detector 22 is connected to the channel selector 21, and provided to detect the volume of the original singer's singing voice and transform the detected volume into a first digital pulse sequence. In this embodiment, the first detector 22 is structured with a low-pass filter 22a and a level detector 22b, as shown in FIG. 2. The low-pass filter 22a is provided to screen out high-frequency noise of the original singer's singing voice, such as white noise and background music. The level detector 22b is provided to transform the volume of the filtered singing voice of the low-pass filter 22a to the first digital pulse sequence. Usually, the low-pass filter 22a can be structured with a simple RC circuit, and the level detector 22b can be structured with a simple OP comparator. The OP comparator is provided to compare the volume of the filtered singing voice with a predetermined value to generate the first digital pulse sequence. That is, the first digital pulse sequence is set to "1" when the volume of the filtered singing voice is over the predetermined value is set to "1", and set to "0" when the volume of the filtered singing voice is under the predetermined value.

Similarly, the second detector 23 is connected to the pre-amplifier 15 of the karaoke system, and provided to detect the volume of the karaoke singer's singing voice and transform the detected volume into a second digital pulse sequence. In this embodiment, the second detector 23 is structured with a low-pass filter 23a and a level detector 23b, as shown in FIG. 2. The low-pass filter 23a is provided to screen out high-frequency noise of the karaoke singer's singing voice, such as white noise and background music. The level detector 23b is provided to transform the volume of the filtered singing voice into the second digital pulse sequence. Usually, the low-pass filter 23a can be structured with a simple RC circuit, and the level detector 23b can be structured with a simple OP comparator. The OP comparator is provided to compare the volume of the filtered singing voice with the predetermined value to generate the second digital pulse sequence. That is, the second digital pulse sequence is set to "1" when the volume of the filtered singing voice is over the predetermined value is set to "1", and set to "0" when the volume of the filtered singing voice is under the predetermined value.

As opposed to the conventional scoring device, the first detector 22 and the second detector 23 of the present invention does not need to perform complicated arithmetic operations to analyze tone and timbre of the original singer's singing voice and the karaoke singer's singing voice, but only needs to detect the volumes of the original singer's singing voice and the karaoke singer's singing voice. Since each karaoke singer has unique and unchangeable timbre, it is unnecessary to take timbre into consideration when singing karaoke at home. Moreover, since lyrics of the song being sung are always displayed on the TV screen, it is also unnecessary to take tone into account. Accordingly, tempo of the karaoke singer's singing voice, which is usually indicated by the volume thereof, is the most important factor when scoring the karaoke singer's singing voice at home. Consequently, the scoring device of the present invention can effectively score the karaoke singer's singing voice without needing a DSP chip.

The processor 24 is provided to sample and compare the first digital pulse sequence of the first detector 22 and the second digital pulse sequence of the second detector 23, and calculate the similarity between the karaoke singer's singing voice and the original singer's singing voice based on the compared results, so that the corresponding score or comments can be output through the display panel 17, such as a LED panel, a LCD panel or a VFD panel, or through the TV screen by OSD method.

Figure 3:
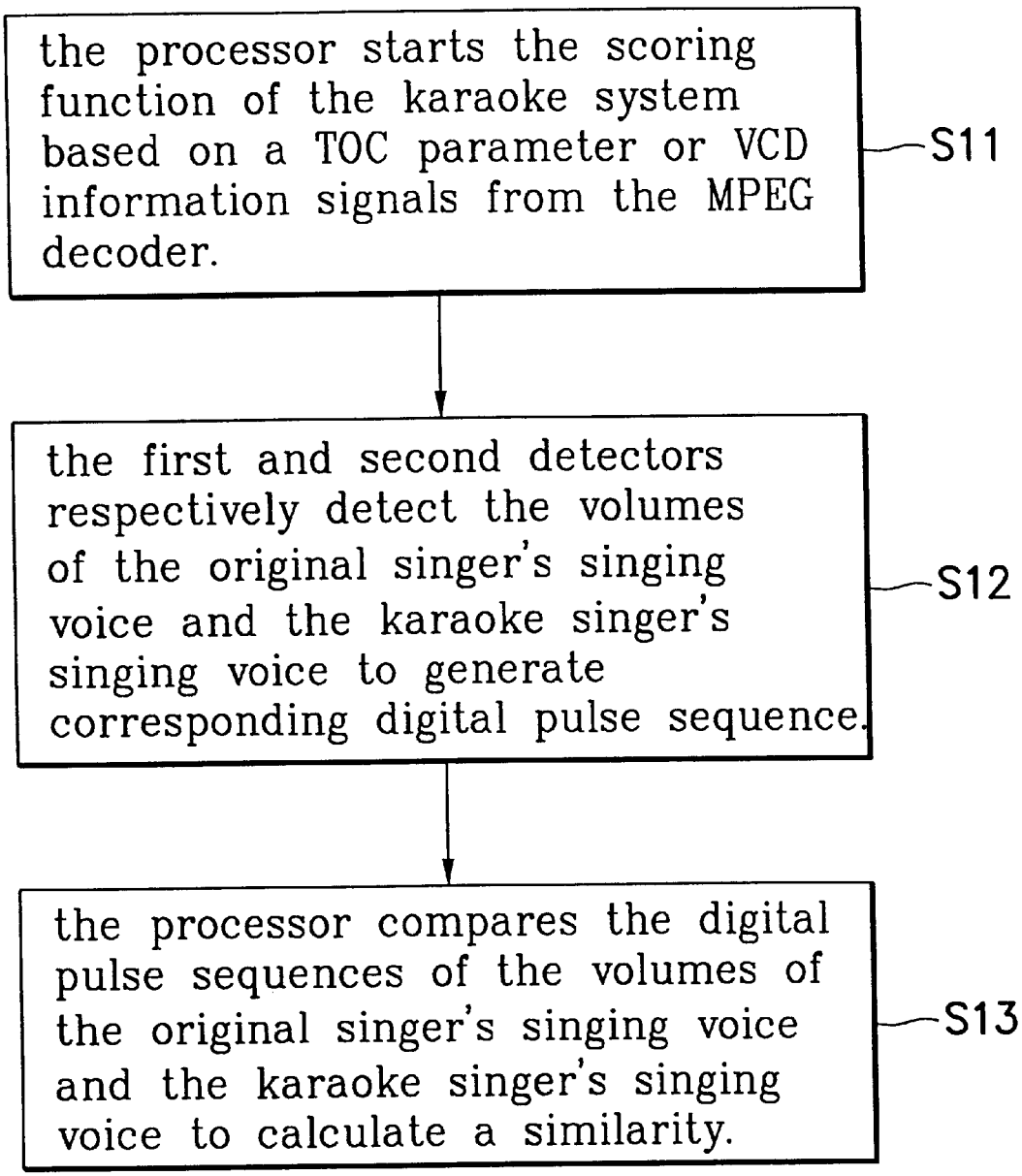
FIG. 3 is a flowchart showing a scoring method for a karaoke system according to the present invention.

FIG. 3 is a flowchart showing the scoring method for the karaoke system according to the present invention.

First, in step S11, the processor 24 reads a TOC parameter or VCD information signals of the MPEG decoder 12 to find the starting and ending points of the dedicated song, and turns on/off the scoring function of the karaoke system accordingly. Alternatively, the processor 24 can also automatically turn on/off the scoring function of the karaoke system when the CD loader 10 receives a karaoke VCD title or when the processor 24 receives corresponding instructions from a remote controller or other I/O devices. Then the channel selector 21 selects an input channel for the original singer's singing voice from the L/R channels of the audio DAC 14.

In step S12, the first detector 22 for the original singer and the second detector 23 for the karaoke singer respectively detect the volumes of original singer's singing voice and the karaoke singer's singing voice, and transforms the detected volumes into a first pulse sequence and a second pulse sequence. In this step, the first detector 22 for the original singer and the second detector 23 for the karaoke singer first screen out high-frequency noise of the original singer's singing voice and the karaoke singer's singing voice, such as white noise and background music, then respectively compare the volumes of the original singer's singing voice and the karaoke singer's singing voice with a predetermined value to generate the first digital pulse sequence and the second digital pulse sequence.

In step S13, the processor 24 calculates the similarity between the volumes of the original singer's singing voice and the karaoke singer's singing voice by comparing the first digital pulse sequence and the second digital pulse sequence. Then, the processor 24 provides a score for the karaoke singer's singing voice based on the calculated similarity, and outputs the score and corresponding comments through the display panel 17, such as a LED panel, a LCD panel or a VFD panel, or through a TV screen by OSD method.

Figure 4:
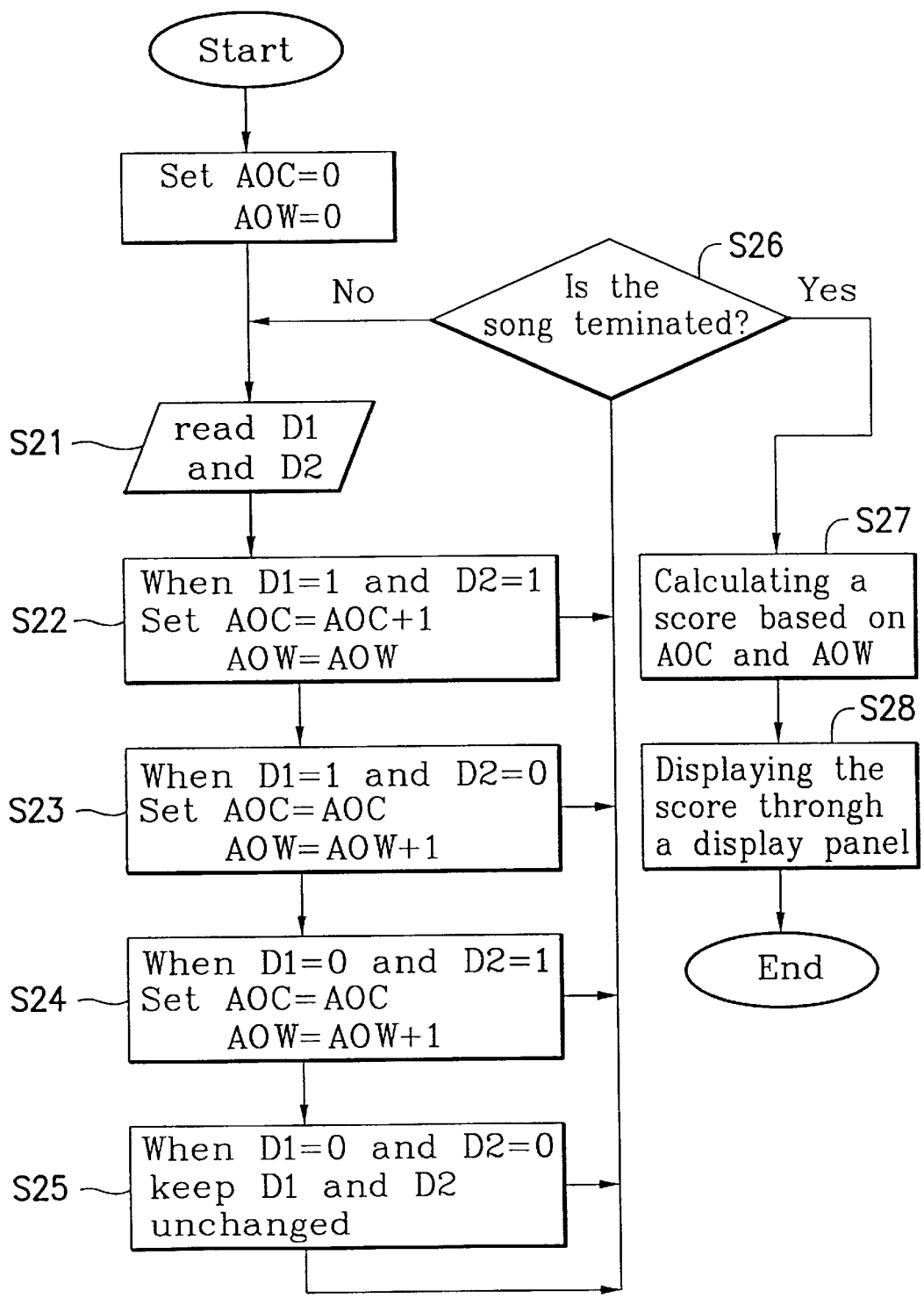
FIG. 4 is a flowchart showing a score-providing method in the scoring method of FIG. 3.

FIG. 4 is a flowchart showing the score-providing step S13 in FIG. 3. In this embodiment, the processor 24 defines a correct parameter AOC and a wrong parameter AOW to calculate the similarity between the original singer's singing voice and the karaoke singer's singing voice.

In step S21, the processor 24 periodically samples the first digital pulse sequence of the original singer's singing voice and the second digital pulse sequence of the karaoke singer's singing voice to produce a first volume parameter D1 indicative of the volume of the original singer's singing voice and a second volume parameter D2 indicative of the volume of the karaoke singer's singing voice.

In steps S22~S25, the processor 24 compares the first volume parameter D1 and the second volume parameter D2. When D1=1 and D2=1, indicating the karaoke singer's singing voice correctly follows the original singer's singing voice, the correct parameter AOC is increased by one. When D1=1 and D2=0, indicating the karaoke singer's singing voice does not follow the original singing voice, the wrong parameter AOW is increased by one. When D1=0 and D2=1, indicating the karaoke singer's singing voice is loud when the original singer's singing voice is silent, the wrong parameter AOW is increased by one. When D1=0 and D2=0, indicating both the original singer's singing voice and the karaoke singer's singing voice are silent, the correct parameter AOC and the wrong parameter AOW are both unchanged.

In step 26, the processor 24 judges whether or not the song is ended, and terminate the loop of the steps S22~S25 if so.

In step S27, the processor 24 provides a score of the karaoke singer's singing voice based on the similarity between the volumes of the original singer's singing voice and the karaoke singer's singing voice by performing arithmetic operations on the correct parameter AOC and the wrong parameter AOW. For example, the score of the karaoke singer's singing voice can be calculated by the following formula:

$$Score=[(AOC-AOW*F)/(AOC+AOW)]*100$$

where F is a positive number indicative of the scoring standard.

For example, the positive number F can be set to 0.1 for a low scoring standard, set to 0.5 for a medium scoring standard, and set to 1 for a high scoring standard. By modifying the positive number F, the weight of the wrong parameter AOW and the calculated score can be adjusted accordingly.

In addition, the calculated score can be optionally modified by the processor 24 to a minimum score (for example, 0) when the calculated score is smaller than the minimum score.

In step S28, the processor 24 outputs the calculated score and corresponding comments through the display panel 17, such as a LED panel, a LCD panel or a VFD panel, or through a TV screen by OSD method.

While the present invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives that have been discussed above and all equivalents thereto.

What is claimed is:

1. A scoring device for a karaoke system, along with a VCD player, comprising:
    a first detector for detecting the volume of a first singer's voice and generating a first digital pulse sequence by comparing the detected volume with a predetermined value;
    a second detector for detecting the volume of a second singer's singing voice and generating a second digital pulse sequence by comparing the detected volume with the predetermined value;
    a channel selector for selecting an input channel of the karaoke system through which the original singer's singing voice is inputted; and
    a processor for comparing the first digital pulse sequence and the second digital pulse sequence, providing a score based on the compared result, and finding the starting and ending points of a dedicated song according to VCD information signals, thereby turning on/off the scoring function of said karaoke system.

2. The scoring device as claimed in claim 1, wherein the first singer's singing voice is an original singer's singing voice, and the second singer's singing voice is a karaoke singer's singing voice.

3. The scoring device as claimed in claim 2,
    wherein the first detector comprises:
        a first low-pass filter for screening out high-frequency noise of the original singer's singing voice; and
        a first level detector for comparing the output of the first low-pass filter and a predetermined value to generate the first pulse sequence; and
    wherein the second detector comprises:
        a second low-pass filter for screening out high-frequency noise of the karaoke singer's singing voice; and
        a second level detector for comparing the output of the second low-pass filter and a predetermined value to generate the second pulse sequence.

4. The scoring device as claimed in claim 3, further comprising a microphone through which the karaoke singer's singing voice is inputted.

5. The scoring device as claimed in claim 3, further comprising:
    a first rectifier for rectifying the first pulse sequence from the first level detector; and
    a second rectifier for rectifying the second pulse sequence from the second level detector.

6. The scoring device as claimed in claim 3, wherein the processor comprises:
    a sampling means for sampling the volumes of the original singer's singing voice and the karaoke singer's singing voice;
    a comparing means for comparing the sampled volumes of the original singer's singing voice and the karaoke singer's singing voice; and
    an arithmetic means for providing the score based on a similarity between the sampled volumes of the original singer's singing voice and the karaoke singer's singing voice.

7. The scoring device as claimed in claim 3, further comprising a display for showing the score.

8. The scoring device as claimed in claim 7, wherein the display is an LED panel.

9. The scoring device as claimed in claim 7, wherein the display is an LCD panel.

10. The scoring device as claimed in claim 7, wherein the display is a VFD panel.

11. The scoring device as claimed in claim 7, wherein the display is a TV screen which shows the score by OSD method.

12. A scoring method for a karaoke system, along with a VCD player, comprising:

detecting the volume of a first singer's singing voice and generating a first digital pulse sequence by comparing the detected volume with a predetermined value;

detecting the volume of a second singer's singing voice and generating a second digital pulse sequence by comparing the detected volume with the predetermined value;

comparing the first digital pulse sequence and the second digital pulse sequence;

providing a score based on the compared result; and finding the starting and ending points of a dedicated song according to VCD information signals, thereby turning on/off the scoring function of said karaoke system.

13. The scoring method as claimed in claim 12, wherein the first singer's singing voice is an original singer's singing voice, and the second singer's singing voice is a karaoke singer's singing voice.

14. The scoring method as claimed in claim 13, further comprising a step of screening out high-frequency noise of the original singer's singing voice before detecting the volume thereof.

15. The scoring method as claimed in claim 13, further comprising a step of screening out high-frequency noise of the karaoke singer's singing voice before detecting the volume thereof.

16. The scoring method as claimed in claim 13, wherein the comparing step comprises:

sampling the volumes of the original singer's singing voice and the karaoke singer's singing voice;

comparing the sampled volumes of the original singer's singing voice and the karaoke singer's singing voice; and calculating the similarity between the sampled volumes of the original singer's singing voice and the karaoke singer's singing voice based on the accumulated similarity.

17. A scoring method as claimed in claim 12, wherein the method further comprises:

generating a first binary value if the detected volume of the first singer's singing voice is higher than the predetermined value and a second binary value if the detected volume is lower than the predetermined value;

generating a first binary value if the detected volume of the second singer's singing voice is higher than the predetermined value and a second binary value if the detected volume is lower than the predetermined value;

comparing the first digital pulse signal of the first singer's singing voice and the second digital pulse signal of the second singer's singing voice;

providing a score based on the compared result; and finding the starting and ending points of a dedicated song according to VCD information signals, thereby turning on/off the scoring function of said karaoke system.

18. The scoring method as claimed in claim 13, wherein the comparing step comprises:

sampling the first digital pulse sequence and the second digital pulse sequence; and calculating the similarity between the sampled first digital pulse sequence and the second digital pulse sequence based on the accumulated similarity.

19. A scoring device for a karaoke system, along with a VCD player, comprising:

a first detector for detecting the volume of a first singer's singing voice and transforming the detected volume into a first digital pulse sequence by comparing the detected volume with a predetermined value and generating a first binary value if the detected volume is higher than the predetermined value and a second binary value if the detected volume is lower than the predetermined value;

a second detector for detecting the volume of a second singer's singing voice and transforming the detected volume into a second digital pulse sequence by comparing the detected volume with the predetermined value and generating a first binary value if the detected volume is higher than the predetermined value and a second binary value if the detected volume is lower than the predetermined value;

a channel selector for selecting an input channel of the karaoke system through which the original singer's singing voice is inputted; and a processor for comparing the first digital pulse signal of the first singer's singing voice and the second digital pulse signal of the second singer's singing voice, providing a score based on the compared result, and finding the starting and ending points of a dedicated song according to VCD information signals, thereby turning on/off the scoring function of said karaoke system.

20. The scoring device as claimed in claim 19, wherein the first detector comprises:

a first low-pass filter for screening out high-frequency noise of the first singer's singing voice; and a first level detector; and wherein the second detector comprises:

a second low-pass filter for screening out high-frequency noise of the second singer's singing voice; and a second level detector.

21. The scoring device as claimed in claim 19, wherein the first binary value is 0 and the second binary value is 1.

22. The scoring device as claimed in claim 19, wherein the first binary value is 1 and the second binary value is 0.

23. The scoring device as claimed in claim 17, wherein the first binary value is 0 and the second binary value is 1.

24. The scoring device as claimed in claim 17, wherein the first binary value is 1 and the second binary value is 0.

25. The scoring device as claimed in claim 20, wherein the level detectors are OP comparators.

* * * * *

UNITED STATES PATENT AND TRADEMARK OFFICE
CERTIFICATE OF CORRECTION

PATENT NO.    : 6,326,536 B1
DATED         : December 4, 2001
INVENTOR(S)   : Hung-Min Wang It is certified that error appears in the above-identified patent and that said Letters Patent is hereby corrected as shown below:

<u>Title page,</u>
Item [73], should read as follows:

-- [73] Assignee: Winbond Electronics Corp., Hsinchu (TW) --

Signed and Sealed this

Nineteenth Day of November, 2002

*Attest:*

*Attesting Officer*

JAMES E. ROGAN
*Director of the United States Patent and Trademark Office*